Nov. 30, 1943.    S. HELLMANNS    2,335,411
METHOD FOR REPAIRING ROLL PASSES
Filed Dec. 11, 1939
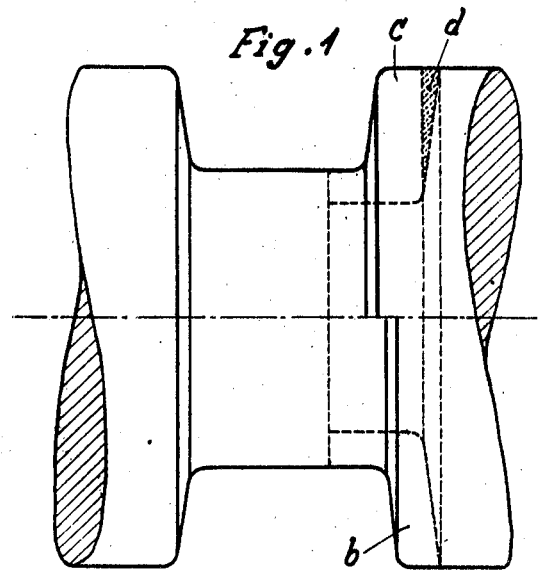
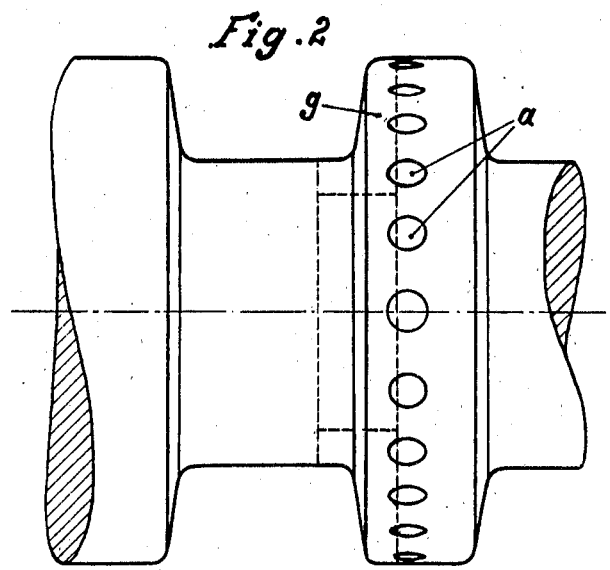
Inventor:
S. Hellmanns Patented Nov. 30, 1943

2,335,411

UNITED STATES PATENT OFFICE 2,335,411

METHOD FOR REPAIRING ROLL PASSES

Simon Hellmanns, Dortmund-Berghofen, Germany; vested in the Alien Property Custodian Application December 11, 1939, Serial No. 308,727
In Germany December 19, 1938

1 Claim. (Cl. 29—148.4)

Rolls, which have to work in every rolling period comparatively large quantities, such as cogging rolls, head rolls in general and the like, evidently show a very strong wear in the corresponding passes which are used again and again. At the repairing of the rolls it is possible to obtain always again the desired pass shape on the base of the pass, but this is not possible on the side faces, as just at these points the wear is very great. On these side faces only simple smoothing is possible. The result is, that the pass width enlarges each time and the rolls must very often be put out of service, although as regards the diameter they still ought to be suitable for use. An orderly and therefore economical working is, however, with these rollers with too wide pass width, no longer possible for the reason that, owing to this too wide pass width, the reduction in the next following pass, be it on the same or on another housing or on another train of rolls, is too high and consequently leads to overloadings of the driving engine. Other inconveniences which may occur are decrease of the rolling speed, cutting out of the automatic protection, sticking fast of the material to be rolled between the rolls, fractures of the roll journals and even damaging of the driving engine. If then, in order to obtain the desired final cross-section, the total pass-number on the corresponding housing were increased, this would be very uneconomical, as then the longest last, that is the passes which are most stressed, would have to be passed through several times.

It has been proposed, in steel rolls, to bring the corresponding passes to the original width by electric moistening welding of the side faces. When using soft electrodes a high wear occurred evidently during the rolling. When electrodes of sufficient hardness and wear resistance were used, too many fissures showed during the treating of the moistened faces. Besides the transition points from the weld to the base material were so hard, that they could be worked only with great difficulty. Also the proceeding, to apply a hard wear-proof layer on to a tough and soft layer did not give the desired result, as the weld burrs were torn out of the connection and just on the side faces. The groove which is thereby formed increased very rapidly and this led again to surface defects on the rolled material. According to the invention perfect repairing of strongly stressed passes is possible.

A pass, which has for instance to be made narrower by a certain measure, is turned on one side or on both sides. Two halves of the same ring of corresponding material and of corresponding cross-section are then inserted and the gaps closed with soft and tough electrodes.

Two different embodiments of the invention are illustrated in the accompanying drawing, in which Fig. 1 is a side elevational view of a roll the dotted lines in the lower half indicating the shape prior to repairing while the dotted lines in the upper half indicate the parts are repaired.

Fig. 2 is a similar view of a modified arrangement.

Fig. 3 is an elevational view of a bolt, and

Fig. 4 is a top plan view of the same.

Fig. 1 shows the lower half of the pass, prior to the repairing, whereas the upper half shows the same pass after the repair. The portion designated by $b$ is first turned. The ring halves $c$ are then inserted and the wedge-shaped gap at $d$ is closed by welding. The small grooves remaining on the joints of the two ring halves are carefully closed by welding. The inserted ring is turned smooth and an absolutely new pass is given to the same at which the material to be rolled does not come into contact with a welded-on surface. In this manner according to the invention it is also possible in rolls which in consideration of the high costs are made of non-alloyed steel, to subsequently insert pass rings of high grade wear-proof material and to thereby considerably lengthen the lastingness of these rolls.

Also cast iron rolls, in which a repairing of the pass walls was not possible at all up to the present, can be much better utilised by insertion of rings according to the invention. In this last instance instead of welding together the ring and the roll, another manner of fixation must be selected. This manner of fixation is illustrated in Figs. 2, 3 and 4.

A corresponding number of holes $a$ is bored into the roll edges. The portion designated by $g$ is then removed by turning, the bore holes being cut at the portion facing the pass. Suitably beveled bolts $e$, as shown in Figs. 3 and 4, are then inserted into these holes. The ring halves are then pushed on and welded the one with the other and with the bolts. With this kind of fixation the ring can expand without any hindrance. Notwithstanding the different expansion coefficients of cast iron and steel on the repaired pass point no prejudicial stresses occur, which might lead to tearing off of the ring.

I claim:

A method of repairing roll passes consisting in boring holes radially of the ball portions of the roll to be repaired, turning out at least a portion of the bottom of the pass and at least one side to an extent sufficient to intersect the portions of the openings, inserting bevelled bolts in the bore of the openings, applying ring segments corresponding in shape substantially to the turned out portions and finally welding the ring segments directly to the bolts.

SIMON HELLMANNS.